(12) United States Patent  
Tzeng et al.

(10) Patent No.: US 10,754,516 B2  
(45) Date of Patent: Aug. 25, 2020

(54) USER INTERFACE

(71) Applicant: GE Inspection Technologies, LP, Lewistown, PA (US)

(72) Inventors: Bright Tzeng, San Ramon, CA (US); Min Chang, San Ramon, CA (US); James Lee, San Ramon, CA (US)

(73) Assignee: GE INSPECTION TECHNOLOGIES, LP, Lewistown, PA (US)

( * ) Notice: Subject to any disclaimer, the term of this patent is extended or adjusted under 35 U.S.C. 154(b) by 5 days.

(21) Appl. No.: 16/000,169

(22) Filed: Jun. 5, 2018

(65) Prior Publication Data

US 2019/0369822 A1 Dec. 5, 2019

(51) Int. Cl.
*G06F 3/0484* (2013.01)
*G06F 3/0481* (2013.01)

(52) U.S. Cl.
CPC .......... *G06F 3/0484* (2013.01); *G06F 3/0481* (2013.01)

(58) Field of Classification Search
CPC .............................. G06F 3/0484; G06F 3/0481
See application file for complete search history.

(56) References Cited

U.S. PATENT DOCUMENTS

| 6,157,381 | A | 12/2000 | Bates et al. | |
|---|---|---|---|---|
| 6,204,846 | B1 * | 3/2001 | Little | G06F 3/04855 715/784 |
| 6,585,776 | B1 * | 7/2003 | Bates | G06F 3/04855 715/206 |
| 6,618,714 | B1 * | 9/2003 | Abrahams | G06Q 30/02 706/45 |
| 7,676,759 | B2 * | 3/2010 | Carter | G06F 3/0485 715/721 |
| 7,714,876 | B1 * | 5/2010 | Hao | G06F 9/451 345/619 |
| 7,836,408 | B1 * | 11/2010 | Ollmann | G06F 3/04855 707/723 |

(Continued)

OTHER PUBLICATIONS

International Search Report and Written Opinion of the International Searching Authority issued in corresponding International Application No. PCT/US2019/034307, dated Sep. 20, 2019, 8 pages.

*Primary Examiner* — Daeho D Song
(74) *Attorney, Agent, or Firm* — Mintz Levin Cohn Ferris Glovsky and Popeo, P.C.

(57) ABSTRACT

The current subject matter provides a GUI that includes an improved navigation bar for visualizing information related to a data set. The navigation bar can allow a user to navigate through, scroll, and/or selectively visualize, certain data within the data set, while also providing visual representations of values recorded within the data set. In one embodiment, the navigation bar can include multiple sections/segments that can correspond to different groups of subsets of the data set. The subsets can be grouped based on values of a particular property/variable recorded in the data set. Colors of each segment of the navigation bar can correspond to values of the property in each group, thereby providing a user with summarized information about the data set. The navigation bar can eliminate a need for additional discrete graphical objects (e.g., charts, graphs, tables, etc.) that would otherwise be used to provide summarized information to the user.

18 Claims, 9 Drawing Sheets

(56) References Cited

U.S. PATENT DOCUMENTS

| | | | |
|---|---|---|---|
| 8,205,168 B1* | 6/2012 | Van Slembrouck | G06F 3/04855 715/786 |
| 8,321,781 B2* | 11/2012 | Tolle | G06F 40/18 715/227 |
| 8,862,980 B2* | 10/2014 | MacGregor | G06F 40/18 715/215 |
| 9,032,327 B2* | 5/2015 | Williams | G06F 3/0482 715/784 |
| 9,176,656 B1* | 11/2015 | Bush | G06F 3/0483 |
| 9,575,621 B2* | 2/2017 | Malik | G06F 3/0481 |
| 9,778,830 B1* | 10/2017 | Dubin | A63F 13/65 |
| 9,864,501 B2* | 1/2018 | Tuli | G06F 3/04855 |
| 10,031,658 B2* | 7/2018 | Ryu | G06F 3/04855 |
| 2002/0077832 A1* | 6/2002 | Leonid | G06F 16/94 704/276 |
| 2004/0008225 A1* | 1/2004 | Campbell | G01C 21/367 715/764 |
| 2006/0277490 A1* | 12/2006 | Sauermann | G06F 3/0485 715/787 |
| 2007/0157112 A1 | 7/2007 | Peters | |
| 2008/0222570 A1* | 9/2008 | MacLaurin | G06F 16/9535 715/839 |
| 2008/0297536 A1* | 12/2008 | Matsuno | G06F 3/0485 345/684 |
| 2009/0070707 A1 | 3/2009 | Schaller et al. | |
| 2010/0077353 A1 | 3/2010 | Moon et al. | |
| 2010/0131886 A1 | 5/2010 | Gannon et al. | |
| 2010/0306648 A1* | 12/2010 | Wilairat | G06F 3/04855 715/702 |
| 2011/0107264 A1* | 5/2011 | Akella | G06F 3/0485 715/830 |
| 2012/0042279 A1* | 2/2012 | Naderi | G06F 3/04855 715/786 |
| 2012/0072444 A1* | 3/2012 | Sharp | G06F 3/0481 707/769 |
| 2012/0204122 A1* | 8/2012 | Brugler | G06F 17/10 715/771 |
| 2012/0229445 A1* | 9/2012 | Jenkins | G06T 15/60 345/418 |
| 2015/0135074 A1* | 5/2015 | Oetzel | G06F 3/04855 715/716 |
| 2015/0177976 A1* | 6/2015 | Ionescu | G06F 3/0488 715/786 |
| 2015/0193094 A1* | 7/2015 | Armitage | G06F 16/904 715/825 |
| 2016/0117092 A1* | 4/2016 | Wang | G06F 3/04855 715/786 |
| 2016/0139793 A1* | 5/2016 | Kish | G06F 3/04842 715/786 |
| 2016/0170629 A1* | 6/2016 | Gabryjelski | G06F 3/04855 715/786 |
| 2016/0350020 A1* | 12/2016 | Uchigaito | G06F 12/0246 |

* cited by examiner

USER INTERFACE

BACKGROUND

Data management systems can be used to manage data related to complex industrial operations. For example, data management systems can be used to monitor, record, analyze, and report on industrial operations such as liquefied natural gas (LNG) processing. The data management systems can generate large data sets that can be stored as part of a database. A graphical user interface (GUI) of the data management system, or another application that interacts with the data management system, can allow users to selectively access and visualize various information available in the database.

SUMMARY

Systems, devices, and methods for generating an improved GUI is provided that includes an improved navigation bar that can provide intuitive view into data of a data set. In one embodiment, a method is provided that includes receiving, at a client and from a database, metadata characterizing a data set stored at the database. The metadata can include a size of the data set, a number of groups within the data set, and a size of each group within the data set. The method can also include determining, by the client and using the received metadata, properties of a first graphical object. The properties can include a number of graphical elements within the first graphical object and a length of each of the graphical elements within the first graphical object. Each graphical element can have a corresponding group within the data set. The length of each graphical element can correspond to a first ratio of the size of the corresponding group to the size of the data set. The method can further include rendering, within a graphical user interface (GUI) display space, the first graphical object. The first graphical object can extend along a first path between a first point and a second point on the GUI display space.

One or more of the following features can be included in any feasible combination. In some embodiments, a first total length of the first graphical object can be defined by a distance along the first path between the first point and the second point.

In some embodiments, the method can include rendering, within the GUI display space, a second graphical object adjacent to the first graphical object. The second graphical object can be configured to travel along a second path that extends between a third point and a fourth point. A first position of the second graphical object on the second path can identify a subset of the data set. The method can also include receiving, at the client, a first portion of the data set. The method can further include rendering, within the GUI display space, a third graphical object adjacent to the first graphical object. The third graphical object can extend between a fifth point and a sixth point along a third path that is parallel to the first path. A position of the sixth point can correspond to a size of the first portion of the data set relative to the size of the data set In some embodiment, the method can include assigning a different color to each graphical element of the first graphical object.

In some embodiments, each group can include at least one subset of the data set. The at least one subset of each group can be determined based on a value assigned to a variable recorded within the at least one subset. Each group can correspond to a different value assigned to the variable.

In some embodiments, a second ratio of a first length of a portion of the third graphical object to the first total length can be equal to a third ratio of the size of the first portion of the data set to the size of the data set. The first length of the portion of the third graphical object can extend between the sixth point and a seventh point where a vector extending from the first point normal to the first path intersects the third path.

In some embodiments, the method can include receiving a second portion of the data set, and adjusting the position of the sixth point based on a size of the second portion of the data set.

In some embodiments, the method can include rendering, within the GUI display space, a second graphical object. The second graphical object can characterize at least a portion of the data set.

In another aspect, a system is provided having at least one data processor and memory coupled to the processor. The memory can store executable instructions, which, when executed by the at least one data processor, implement operations which can include receiving, at a client and from a database, metadata characterizing a data set stored at the database. The metadata can include a size of the data set, a number of groups within the data set, and a size of each group within the data set. The operations can also include determining, by the client and using the received metadata, properties of a first graphical object. The properties can include a number of graphical elements comprising the first graphical object and a length of each of the graphical elements within the first graphical object. Each graphical element can have a corresponding group within the data set. The length of each graphical element can correspond to a first ratio of the size of the corresponding group to the size of the data set. The operations can further include rendering, within a graphical user interface (GUI) display space, the first graphical object. The first graphical object can extend along a first path between a first point and a second point on the GUI display space.

One or more of the following features can be included in any feasible combination. In some embodiments, a first total length of the first graphical object can be defined by a distance along the first path between the first point and the second point.

In some embodiments, the operations can include rendering, within the GUI display space, a second graphical object adjacent to the first graphical object. The second graphical object can be configured to travel along a second path that extends between a third point and a fourth point. A first position of the second graphical object on the second path can identify a subset of the data set. The operations can also include receiving, at the client, a first portion of the data set. The operations can further include rendering, within the GUI display space, a third graphical object adjacent to the first graphical object. The third graphical object can extend between a fifth point and a sixth point along a third path that is parallel to the first path. A position of the sixth point can correspond to a size of the first portion of the data set relative to the size of the data set.

In some embodiments, the operations can include assigning a different color to each graphical element of the first graphical object.

In some embodiments, each group can include at least one subset of the data set. The at least one subset of each group can be determined based on a value assigned to a variable recorded within the at least one subset. Each group can correspond to a different value assigned to the variable.

In some embodiments, a second ratio of a first length of a portion of the third graphical object to the first total length can be equal to a third ratio of the size of the first portion of the data set to the size of the data set. The first length of the portion of the third graphical object can extend between the sixth point and a seventh point where a vector extending from the first point normal to the first path intersects the third path.

In some embodiments, the operations can include receiving a second portion of the data set, and adjusting the position of the sixth point based on a size of the second portion of the data set.

In some embodiments, the operations can include rendering, within the GUI display space, a second graphical object. The second graphical object can characterize at least a portion of the data set.

In another aspect, a non-transitory computer program product is provided having computer readable instructions, which, when executed by at least one data processor forming part of at least one computing system, implement operations which can include receiving, at a client and from a database, metadata characterizing a data set stored at the database. The metadata can include a size of the data set, a number of groups within the data set, and a size of each group within the data set. The operations can also include determining, by the client and using the received metadata, properties of a first graphical object. The properties can include a number of graphical elements comprising the first graphical object and a length of each of the graphical elements within the first graphical object. Each graphical element can have a corresponding group within the data set. The length of each graphical element can correspond to a first ratio of the size of the corresponding group to the size of the data set. The operations can further include rendering, within a graphical user interface (GUI) display space, the first graphical object. The first graphical object can extend along a first path between a first point and a second point on the GUI display space.

One or more of the following features can be included in any feasible combination. In some embodiments, a first total length of the first graphical object can be defined by a distance along the first path between the first point and the second point.

In some embodiments, the operations can include rendering, within the GUI display space, a second graphical object adjacent to the first graphical object. The second graphical object can be configured to travel along a second path that extends between a third point and a fourth point. A first position of the second graphical object on the second path can identify a subset of the data set. The operations can also include receiving, at the client, a first portion of the data set. The operations can further include rendering, within the GUI display space, a third graphical object adjacent to the first graphical object. The third graphical object can extend between a fifth point and a sixth point along a third path that is parallel to the first path. A position of the sixth point can correspond to a size of the first portion of the data set relative to the size of the data set.

In some embodiments, the operations can include assigning a different color to each graphical element of the first graphical object.

In some embodiments, each group can include at least one subset of the data set. The at least one subset of each group can be determined based on a value assigned to a variable recorded within the at least one subset. Each group can correspond to a different value assigned to the variable.

In some embodiments, a second ratio of a first length of a portion of the third graphical object to the first total length can be equal to a third ratio of the size of the first portion of the data set to the size of the data set. The first length of the portion of the third graphical object can extend between the sixth point and a seventh point where a vector extending from the first point normal to the first path intersects the third path.

In some embodiments, the operations can include receiving a second portion of the data set, and adjusting the position of the sixth point based on a size of the second portion of the data set.

In some embodiments, the operations can include rendering, within the GUI display space, a second graphical object. The second graphical object can characterize at least a portion of the data set.

DESCRIPTION OF DRAWINGS

These and other features will be more readily understood from the following detailed description taken in conjunction with the accompanying drawings, in which.

DETAILED DESCRIPTION

Certain exemplary embodiments will now be described to provide an overall understanding of the principles of the structure, function, manufacture, and use of the systems, devices, and methods disclosed herein. One or more examples of these embodiments are illustrated in the accompanying drawings.

Data management systems can be used to manage large volumes of data, for example, data related to the operation of oil and gas industrial machines and facilities. But when a user wishes to view a dataset contained in the data management system using some traditional interfaces, it can be challenging to interpret or gain an intuitive understanding of the dataset by only viewing the dataset (e.g., in tabular form). Accordingly, an improved GUI is provided that includes an improved navigation bar that provides for an intuitive view into the underlying dataset. This improved navigation bar can allow a user to better understand, at a glance, the contents of the data set. Such an improved navigation bar can result in improved data management systems, which can reduce time, cost, and resources spent in analyzing data.

As an example, the navigation bar can provide a user with a distribution of values contained within the data set. The navigation bar can allow a user to navigate through, scroll, and/or selectively visualize certain data within the data set, while also providing visual representations of values recorded within the data set. In some instances, this intuitive interface can enable a user to ascertain, at a glance, the distribution of values within the data set. For example, the navigation bar can include multiple sections and/or segments that can be different colors. Each segment can correspond to a different group of subsets of the data set. The subsets can be grouped based on values of a particular property and/or variable recorded in the data set. The color of each segment of the navigation bar can correspond to values of the property, or variable, in each group, thereby providing a user with summarized information about the data set. By providing additional information about the data set within the navigation bar, the navigation bar can eliminate a need for additional discrete graphical objects (e.g., charts, graphs, tables, etc.) that would otherwise be used to provide summarized information to the user. Therefore, the improved navigation bar can reduce an amount of display space required to convey information to a user, and/or allow additional information to be provided to a user without using additional display space.

Figure 1:
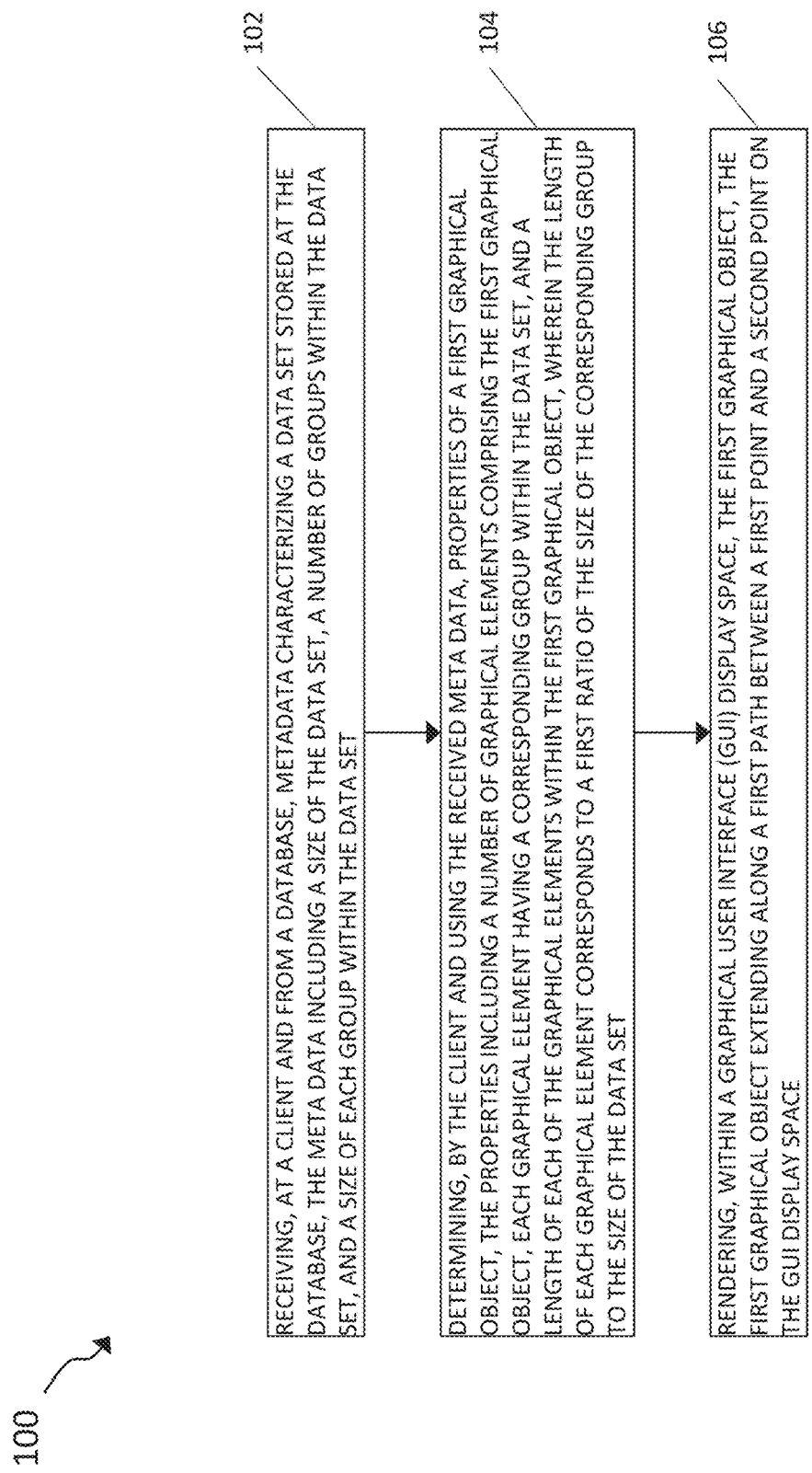
FIG. 1 is a flow diagram illustrating an exemplary method of rendering a graphical user interface (GUI) based on data received from a database.

FIG. 1 shows a flow diagram illustrating an example of a method 100 of rendering a graphical user interface (GUI) based on data received from a database. The GUI can provide for an intuitive view into an underlying data set, thereby providing an improved user interface.

At step 102, metadata characterizing a data set can be received. The metadata can include a size of the data set, a number of groups within the data set, and a size of each group within the data set. In some embodiments, the metadata can be received at a client, and can be provided by a database. As an example, the client and the database can be coupled via a network. The client can request the data set from the database via the network. In some embodiments, the client can be a computer (e.g., laptop or a desktop), a handheld device (e.g., a tablet, mobile phone, etc.), and/or a wearable device (e.g., a headset). In some embodiments, the data set can include information characterizing operations of an industrial operation such as, e.g., liquefied natural gas (LNG) processing operation. As an example, the data set can include values corresponding properties, or variables, such as, e.g., username, or author, that entered the data, a title corresponding to the entry, an ARL value, a date identifying when some, or all, of the data set was updated, as well as other information corresponding to user selectable options. The data set can include other values corresponding to other variables such as, e.g., temperatures, pressure, durations, flow rates, compositions of materials processed, etc., corresponding to the industrial operation. In some embodiments, subsets, or entries, within the data set can be grouped based on values assigned to a particular property, or variable, (e.g., ARL), which can be referred to as a sorting property, or sorting variable. For example, if the data set includes subsets in which sorting variables have values of [1, 2, 1, 4, 2, 5, 7, 4, 7, 2], respectively, the subsets can be sorted to form groups of [1, 1], [2, 2, 2], [4, 4], [5], [7, 7].

At step 104, properties of a first graphical object can be determined. The properties can include a number of graphical elements comprising the first graphical object, and a length of each of the graphical elements within the first graphical object. In some embodiments, each graphical element can have a corresponding group within the data set, and the length of each graphical element can correspond to a first ratio of the size of the corresponding group to the size of the data set. As an example, the first graphical object can be a navigation bar that can be configured to enable a user to navigate through, scroll, and/or selectively visualize, certain data within the table. The graphical elements can be sections and/or segments of the navigation bar. Each section and/or segment of the navigation bar can represent a different group of subsets, or entries, within the data set. For example, if a data sent includes ten subsets, or entries, that are sorted into four groups based on values of a particular sorting property, or sorting variable, then the navigation bar can include four sections and/or segments. Each section and/or segment of the navigation bar can correspond to a different group within the data set.

At step 106, the first graphical object can be rendered within a graphical user interface display space. The first graphical object can extend along a first path between a first point and a second point on the GUI display space.

Figure 2:
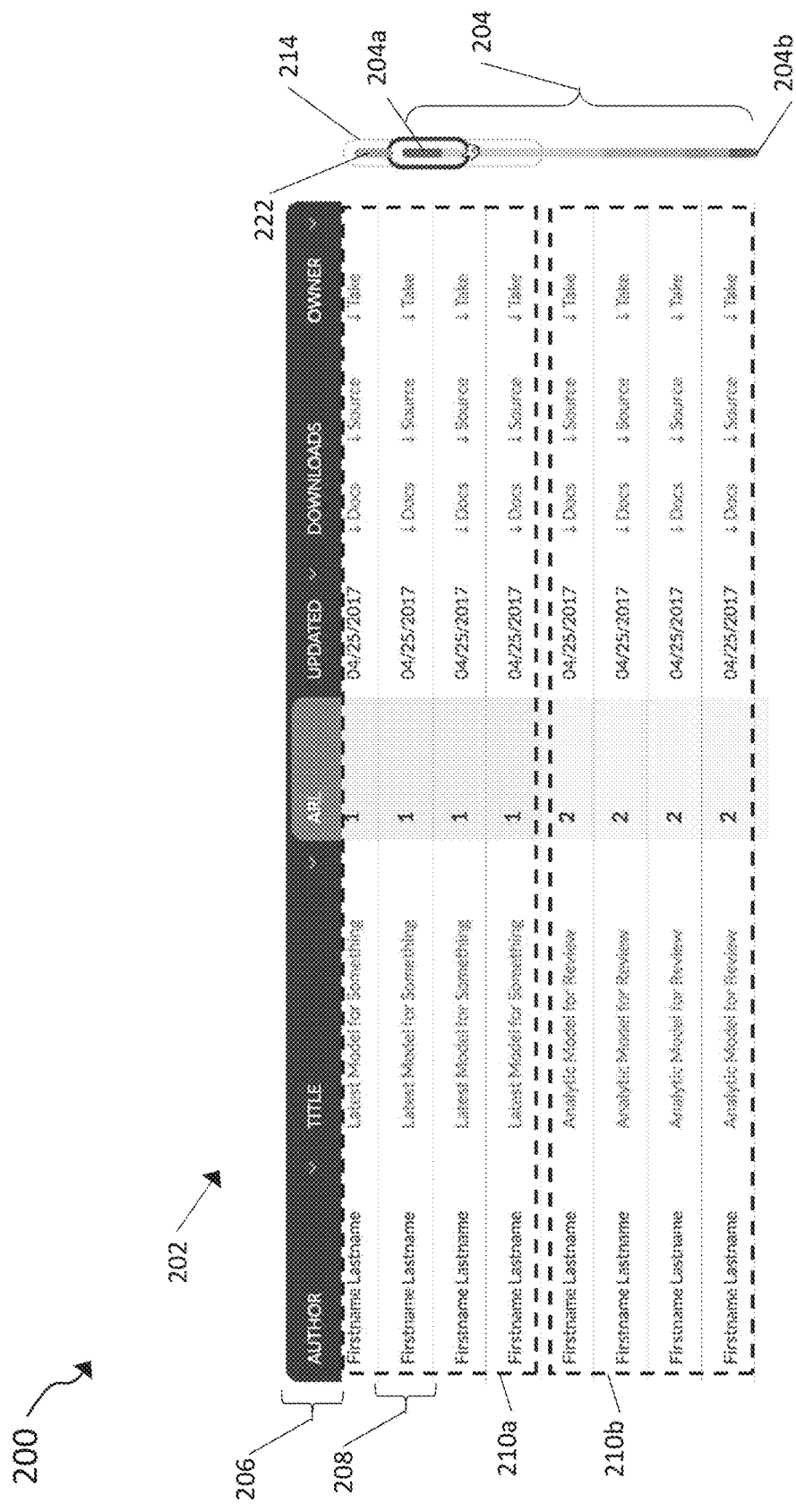
FIG. 2 is an exemplary view of a GUI that can be rendered at a client, the GUI having an improved navigation bar.

FIG. 2 shows an exemplary view 200 of an example GUI that can be rendered at a client based on the method 100 described herein. The GUI can include a table 202 and a navigation bar 204 that can allow a user to navigate data displayed in the table. As shown in FIG. 2, the table 202 includes a heading 206 and a number of subsets 208, or entries, of a data set received from a database. The heading 206 lists properties, or variables, (e.g., column names) that are included in each of the subsets 208 of the data set. In the illustrated example, the properties include author, title, ARL, updated, downloads, and owner. Each property can correspond to a given column of the table 202 that includes values of the given property for each subset 208. In some embodiments, the subsets 208 can be sorted, or grouped, based on a value of one of the properties. For example, the subsets 208 can be grouped based on values of a sorting property, or sorting variable. As shown in FIG. 2, a portion of the data set that is illustrated in the table contains groups 210a, 210b of subsets 208 that are organized based on the values of the ARL property.

The navigation bar 204 can be positioned adjacent to the table 202 and can extend along a first path between points 204a, 204b. In some embodiments, a total length of the navigation bar 204 can be defined by the first bath between the first and second points 204a, 204b.

Figure 3:
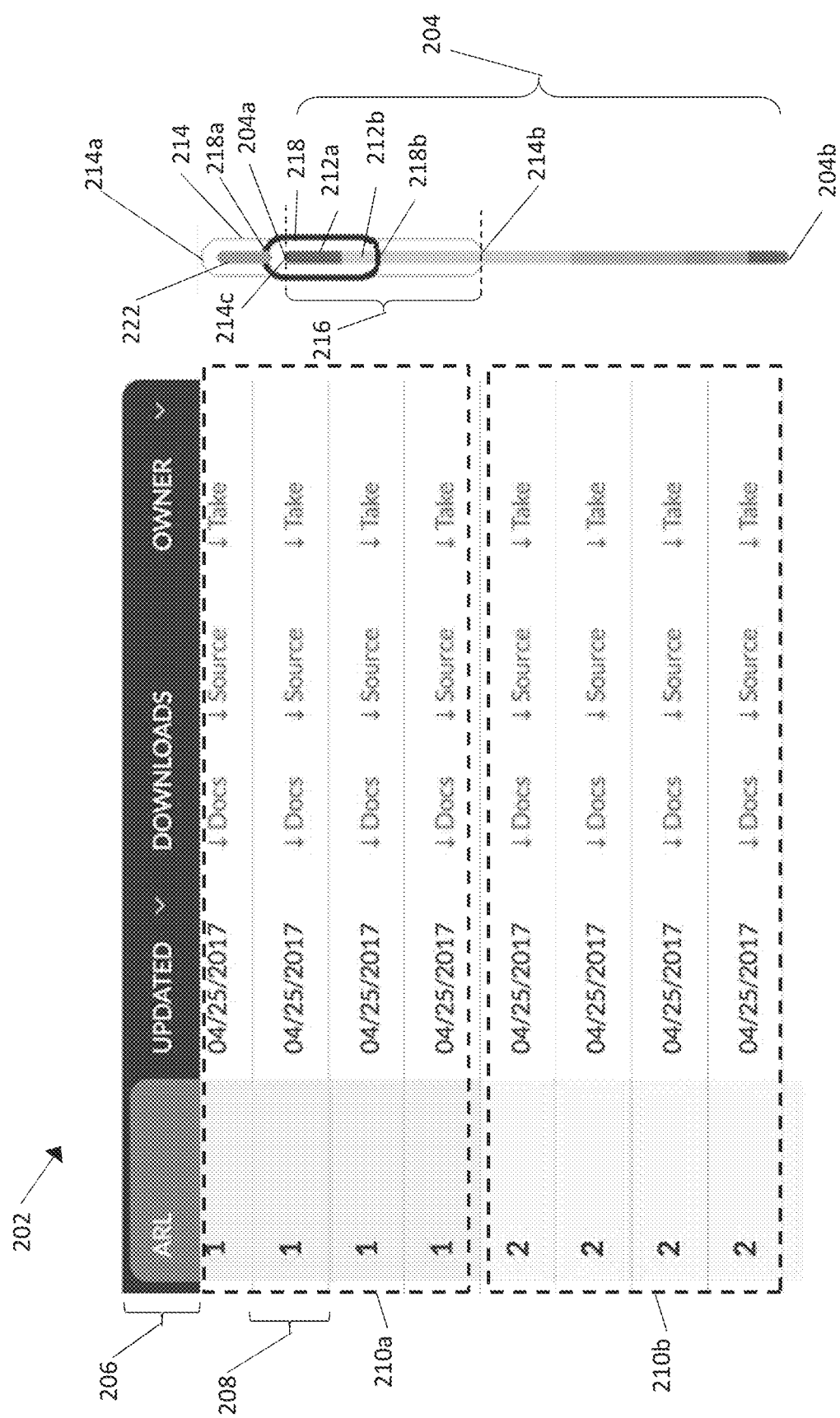
FIG. 3 is a magnified view of a portion of the GUI shown in FIG. 2.

FIG. 3 shows an enlarged view of a portion of the view 200 of the GUI. As shown in FIG. 3, the navigation bar 204 can include multiple different sections (e.g., sections 212a, 212b). Each section (e.g., sections 212a, 212b) can correspond to a group (e.g., groups 210a, 210b) of subsets of the portion of the data set received from the database. As shown in the illustrated example, each section can be color coded to match an indicator such as, e.g., a background color of the sorting property (e.g., the ARL property). In some embodiments, a length of each section (e.g., sections 212a, 212b) can be determined based on sizes of the corresponding groups (e.g., groups 210a, 210b). For example, the length of each section can be determined such that a ratio of the length of the section to the total length of the navigation bar 204 is equivalent to a ratio of the size of the corresponding group to a size of the data set requested from the database. The color-coded sections of the navigation bar 204 can allow a user to quickly, and easily, identify relative sizes of the various groups of subsets. The colors of each section of the navigation bar 204 can also allow a user to identify values of the sorting property within subsets of each group.

The navigation bar 204 can be an interactive graphical object of the GUI. For example, each point on the navigation bar 204 can be associated with a subset 208 of the data set. A user can select a point on the navigation bar 204 using e.g., a cursor, finger, stylus, etc., or another input device, and the table 204 can show a corresponding subset 208 of the data set.

As shown in FIGS. 2-3, the GUI can include a loading bar 214 configured to indicate an amount of the data set received from the database. As shown FIG. 3, in the illustrated example, the loading bar 214 can extend along a second path between points 214*a*, 214*b*, and can be positioned adjacent to and/or behind the navigation bar 204. In some embodiments, the loading bar 214 can be overlaid on top of the navigation bar 204. The second path can be parallel to the first path (e.g., the path along which the navigation bar 204 extends). A position of the point 214*b* can correspond to a size of the received portion of the data set relative to the total size of the data set. For example, if the point 214*b* is positioned at a midpoint between points 204*a*, 204*b*, the loading bar can indicate that half of the total data set has been received from the database. As another example, a portion 216 of the loading bar 214 can extend between the point 214*b* and a point 214*c* where a vector extending from the point 204*a*, normal to the first path (e.g., the path along which the navigation bar 204 extends), intersects the second path (e.g., the path along which the loading bar 214 extends). A ratio of a length of the portion 216 of the loading bar 214 to the total length of the navigation bar 204 can be equal to a ratio of the size of the portion of the data set received from the database to the total size of the data set.

Figure 4:
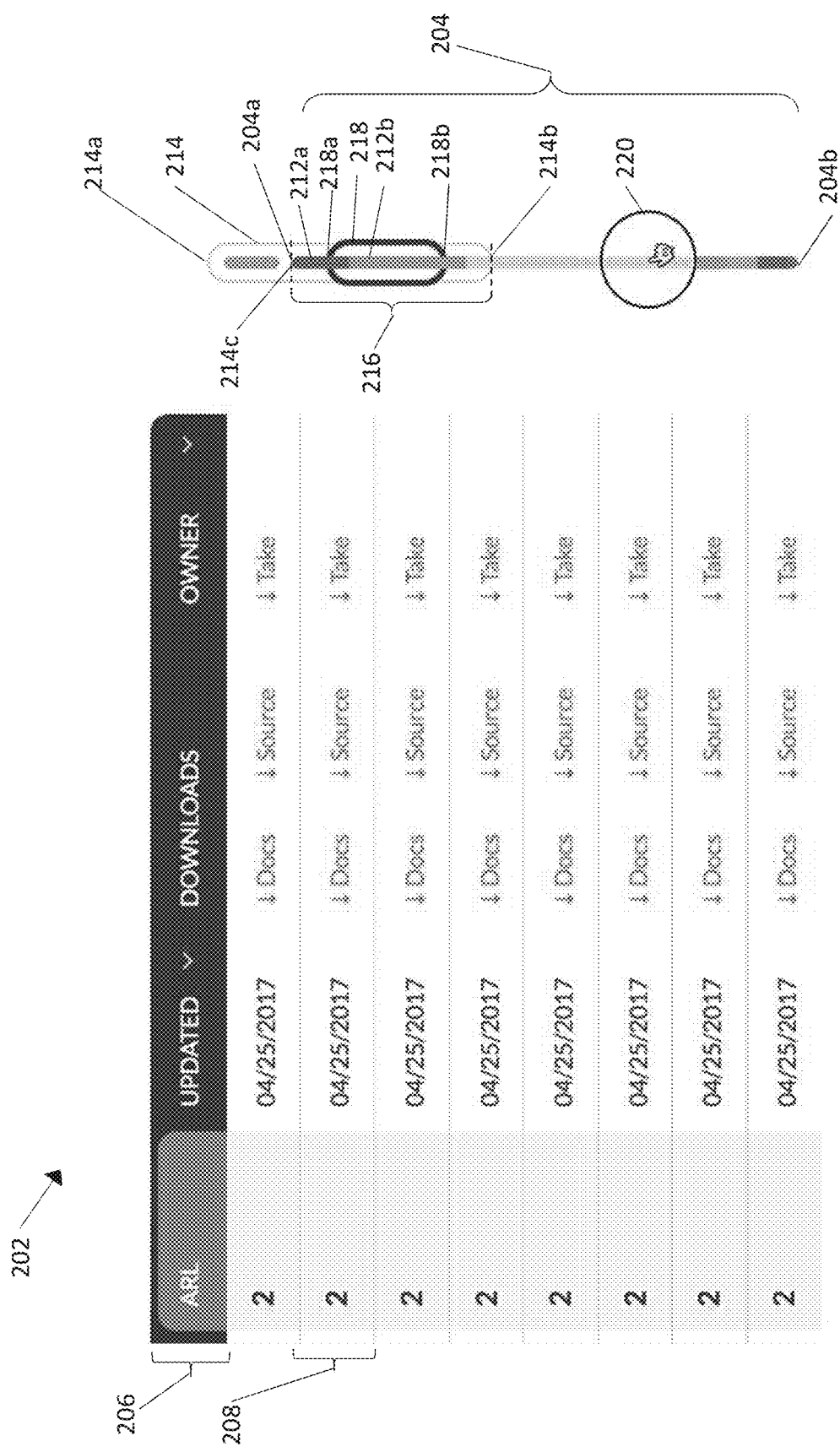
FIG. 4 is a another magnified view of the GUI shown in FIG. 2.

As shown in FIGS. 2-3, the GUI can include a position identifier 218 configured to identify which portion of the dataset is shown in the table 202. The position identifier 218 can be configured to travel along a third path that is parallel to the first path (e.g., the path along which the navigation bar 204 extends) and extend between a two points 218*a*, 218*b*. As another example, the third path can be laterally offset from the first path. As shown in FIGS. 2-3, the position identifier 218 can encompass a portion of the navigation bar 204, thereby identifying which portion of the dataset is shown in the table 202. For example, in some embodiments, subsets of the dataset corresponding to the portion of the navigation bar 204 that is within an outer boundary of the position identifier 218 can be shown in the table 202. As described above, the user can select a point on the navigation bar 204 to select or adjust subsets of the data set that are presented in the table. When the user selects a point on the navigation bar 204, the position identifier 218 can move to the point selected by the user. A shape of the position identifier 218 can be oval, circular, elliptical, square, rectangular, etc. In some embodiments, when a user selects a point on the navigation bar 204, an indicator icon 220 can be rendered and shown on the GUI, as shown in FIG. 4. The indicator icon 220 can provide a user with visual feedback to confirm that a point on the navigation bar 204 has been selected.

In some embodiments, the GUI can include a button 222 that can be configured to identify subsets 208 of the data set that have predetermined characteristics. For example, the button 222 can be configured to identify subsets 208 that have been updated before, or after, a predetermined date. As another example, the button 222 can be configured to identify subsets 208 that have ARL values that are above, or below, a predetermined threshold. A user can select the button 222, and the corresponding subsets 208 can be shown in the table 202. In some embodiments, the button 222 can be configured to identify a subset containing null, or otherwise unexpected and/or undefined, values.

Figure 5:
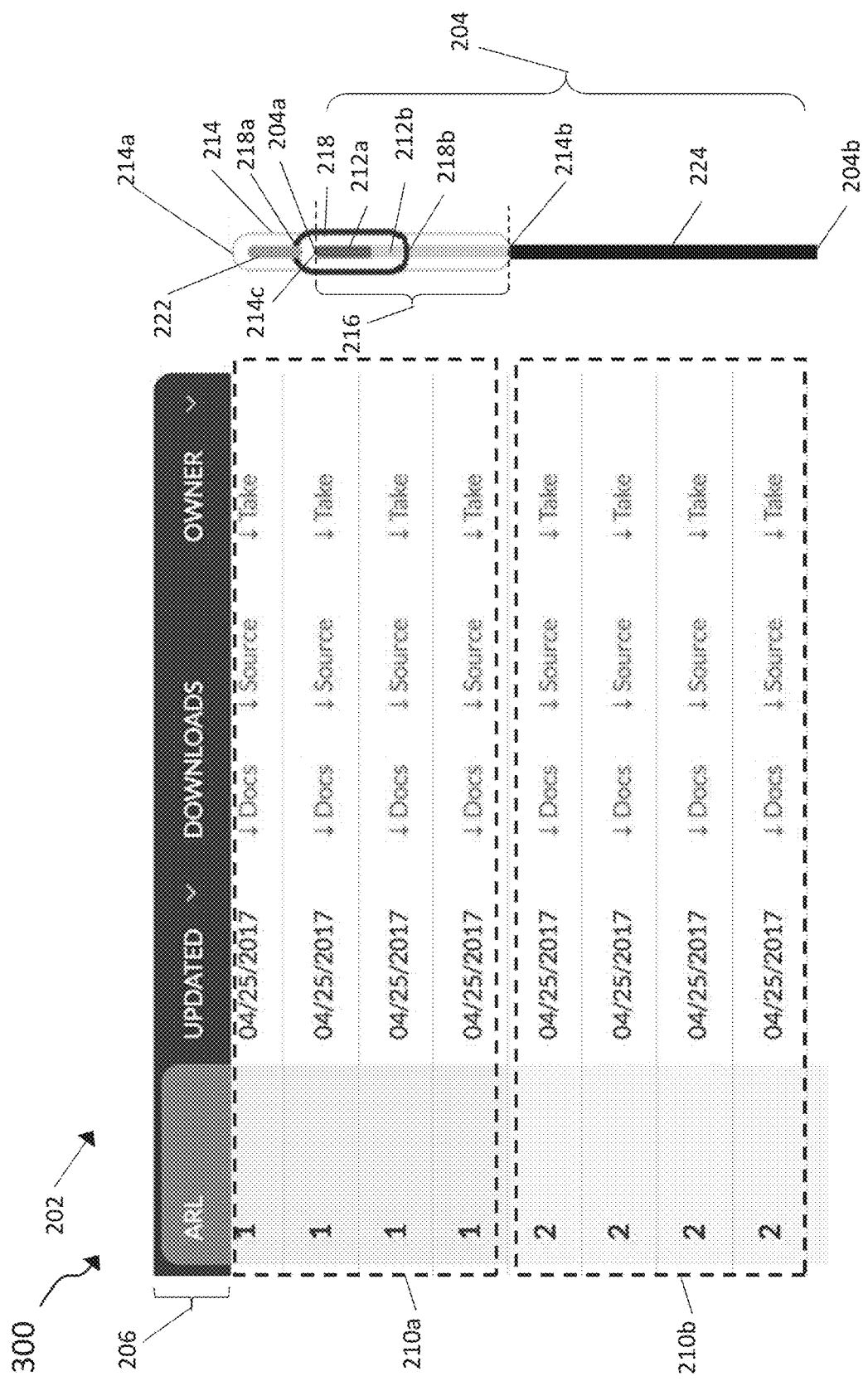
FIG. 5 is another exemplary view of a GUI that includes a variation of the navigation bar shown in FIG. 2.

As shown in FIGS. 2-4, the loading bar 214 indicates that only a portion of the requested data set has been received by the client. In some embodiments, sections of the navigation bar 204 corresponding to portions of the data set that have not been received can be rendered as single color, without specific sections. For example, FIG. 5 shows a view 300 of a portion of the GUI, where a portion 224 of the navigation bar 204 is rendered as a single color. The portion 224 of the navigation bar 204 corresponds to a portion of the data set that has not been received by the client. As subsets 208 of the data set are received at the client, the position of the point 214*b* can extend toward the point 204*b*, and individual sections of the portion 224 can be identified and rendered with appropriate lengths and colors, as described herein with regard to sections 212*a*, 212*b*.

Figure 6:
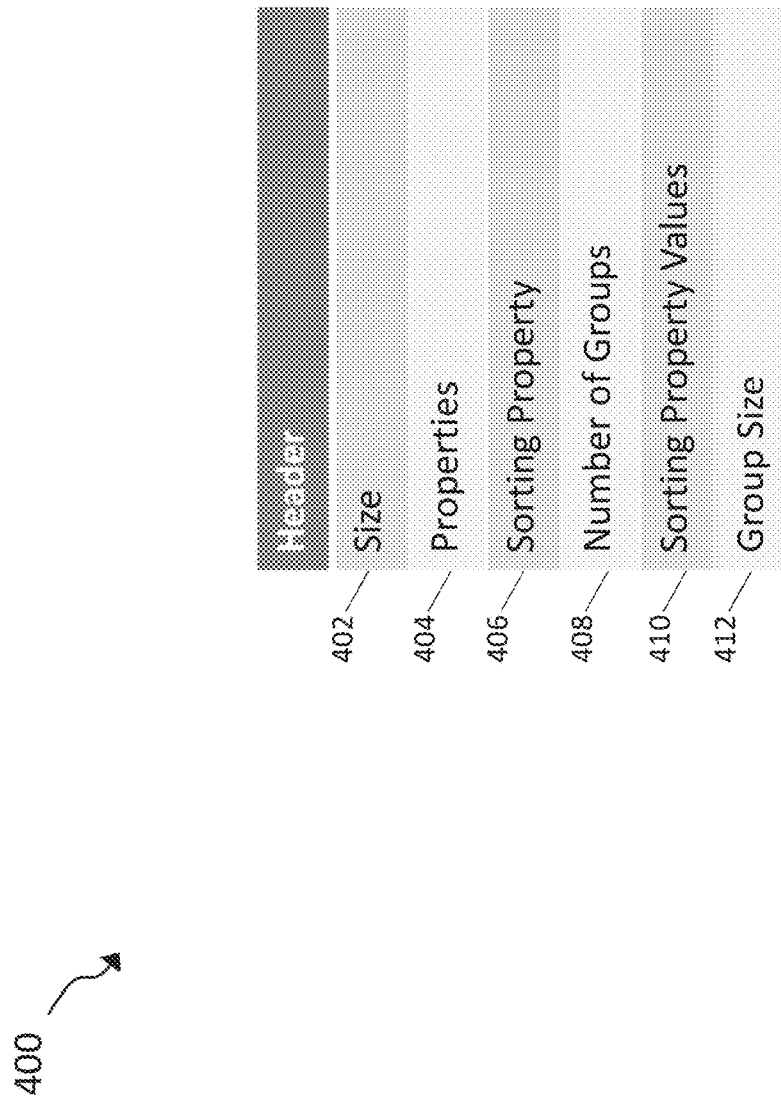
FIG. 6 is a header that can be received from a database.

In some embodiments, the database can provide metadata (e.g., a header) to the client. The header can include information describing characteristics of the requested data set. In some embodiments, data within the header can be used to generate the navigation bar 204 and/or populate portions of the table 202 (e.g., generate the heading, and/or populate values associated with the sorting property). FIG. 6 shows an example of a header 400 that can be provided by the database to the client after the data set is requested. The header 400 can include a size field 402, properties field 404, sorting property field 406, number of groups field 408, sorting property values field 410, and group size field 412. The size field 402 can include data describing the size of the requested data set.

The properties field 404 can list properties for which values are recorded in each subset (e.g., subsets 208) of the data set. The properties field 404 can provide properties that are shown in the heading 206 of the table 202. The sorting property field 406 can identify a sorting property (e.g., ARL) that can be used to group subsets 208. In some embodiments, the sorting property can be a predetermined default property. In other embodiments, a user can select a sorting property when requesting the data set from the database. The number of groups field 408, can describe a number of groups of subsets 208 for which there are distinct values of the sorting property. The sorting property values field 410 can identify values of the sorting property corresponding to each group of subsets 208. The group size field 412 can include data describing a size of each group. For example, the group size field 412 can describe a number of subsets in each group.

Figure 7:
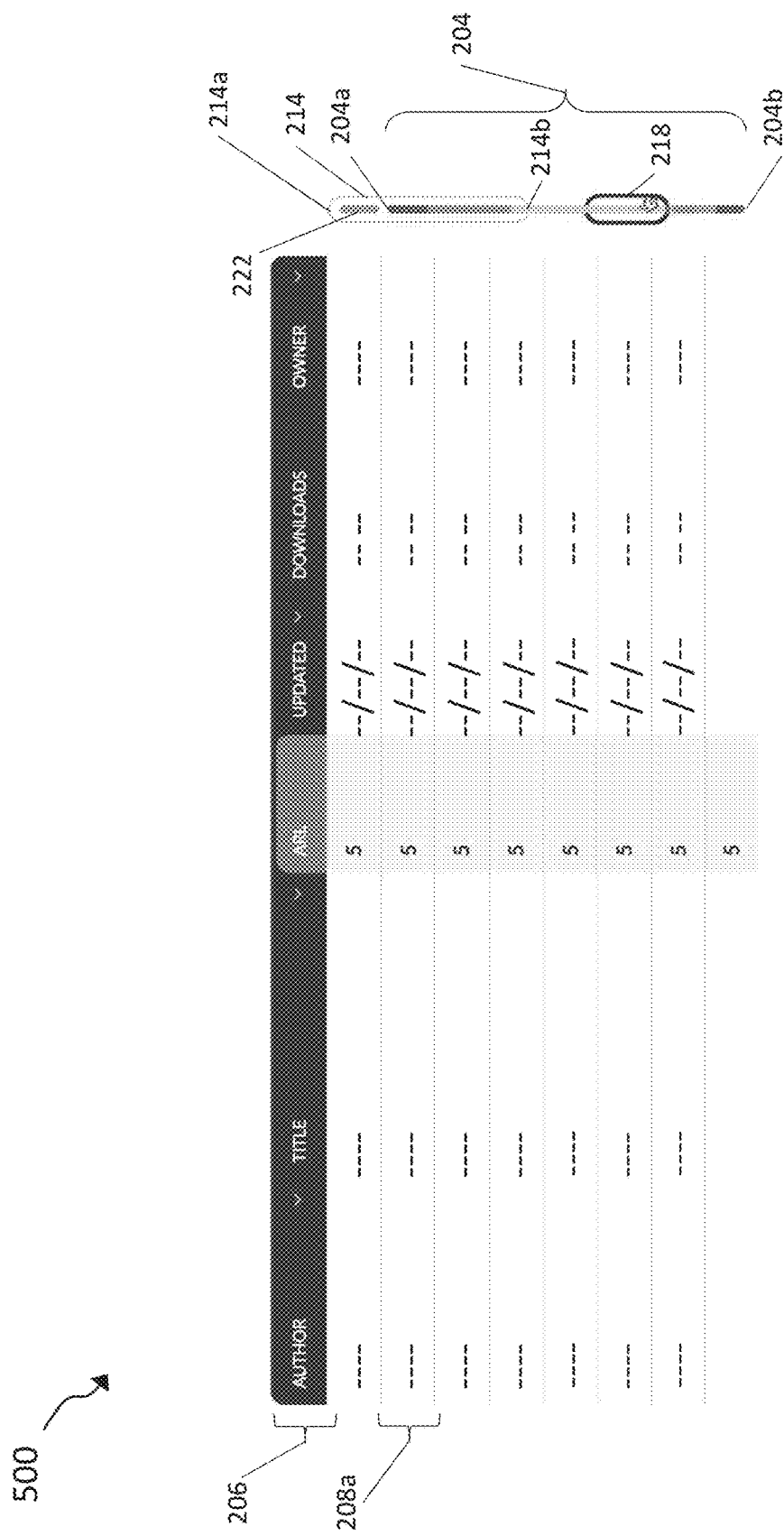
FIG. 7 is another embodiment of a view of a GUI that includes unpopulated subsets.

Information from the header 400 can be used to populate and/or render certain portions of the GUI. FIG. 7 shows a view 500 of the GUI in which only a portion of the data set has been received at the client. As shown in FIG. 7, subsets 208*a* corresponding to portions of the data set that have not been received at the client remain unpopulated. However, based on data provided within the header 400, certain portions of the GUI can be populated and/or rendered. For example, the navigation bar can be generated and rendered based on data from the size field 402, sorting property field 406, number of groups field 408, sorting property values field 410, and group size field 412. Similarly, the heading 206 can be generated and rendered using data provided in the properties field 404 and the sorting property field 406. Additionally, values corresponding of the sorting property (e.g., ARL) can be populated based on data from the sorting property values field 410 and the group size field 412. By utilizing a header, the navigation bar can be rendered based on the entire data set, without having to receive (e.g., download) the entire data set.

Figure 8:
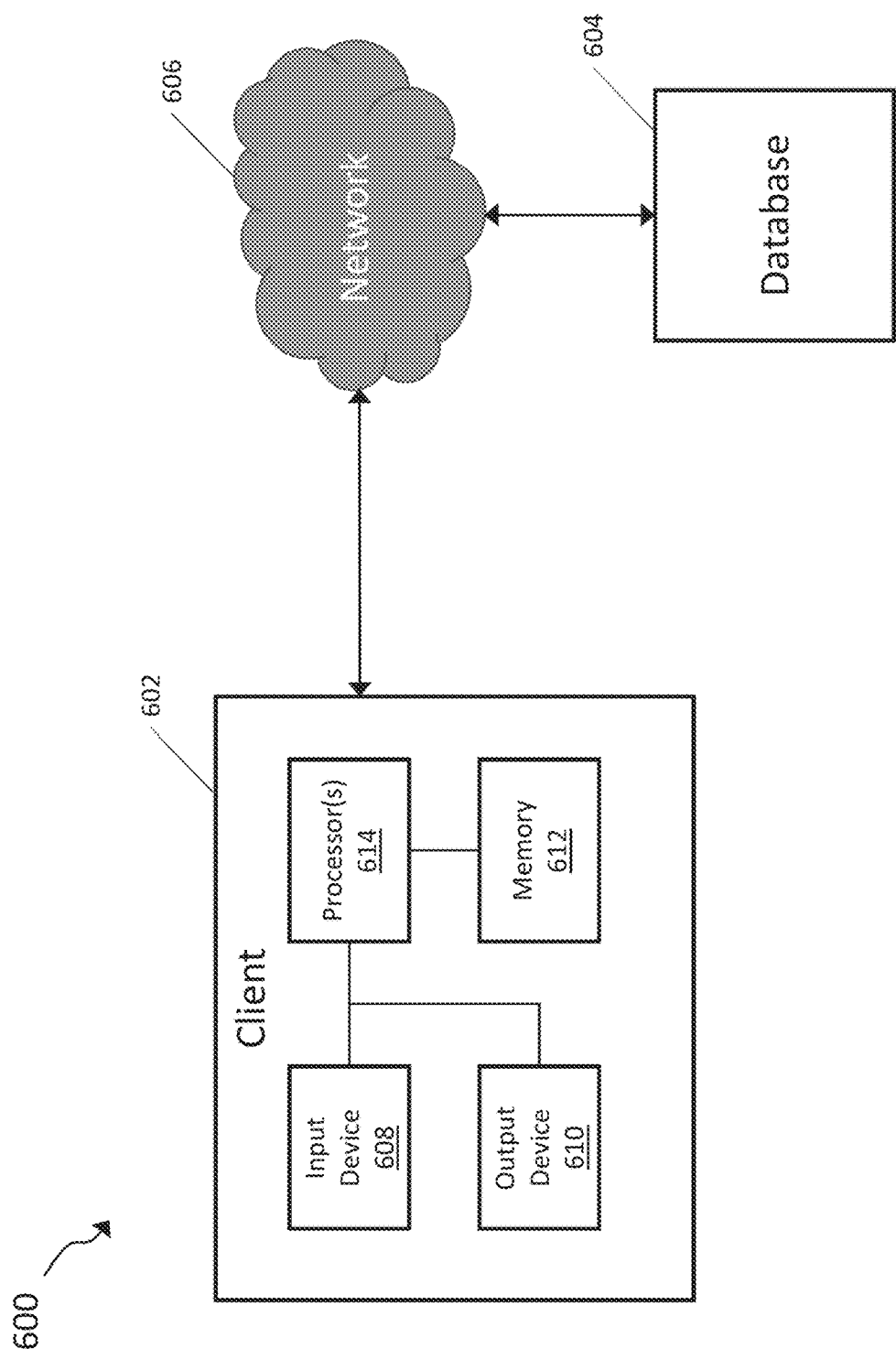
FIG. 8 is a block diagram of an exemplary system that can be used to render the views of the GUI shown in FIGS. 2-5 and 7.

FIG. 8 illustrates an exemplary system block diagram of an embodiment of a system 600 configured to generate the GUI and perform the methods described herein. As shown in FIG. 8, the system 600 can include a client 602 and a database 604. The client 602 and the database 604 can be in electronic communication with the database 604 via a network 606. The database 604 can include data sets that contain information related to industrial operations such as, e.g., production of liquefied natural gas (LNG).

The client 602 can include an input device 608, an output device 610, memory 612, at least one data processor 614, and/or other circuitry configured facilitate operation as described herein. The input device 608 and output device 610 can be in electronic communication with the processor 614. The input device 608 can be configured to receive a user input and provide the user input to the processor 614. The output device 610 can be configured to receive data from the processor and provide the data to a user. As an example, the input device 608 can be, or can include, a keyboard, a pointing device (e.g., a mouse, trackball, stylus, etc.), a gesture recognition device (e.g., a camera), a microphone, etc., by which the user can provide input to the computer. As another example, the output device 610 can be, or can include, a display device such as, e.g., a CRT (cathode ray tube), LCD (liquid crystal display) monitor, and/or LED (light-emitting diode) display. In some embodiments, the output device 610 can be in interactive display such as, e.g., a touchscreen display. In that case, the output device 610 can also function as the input device 608.

Figure 9:
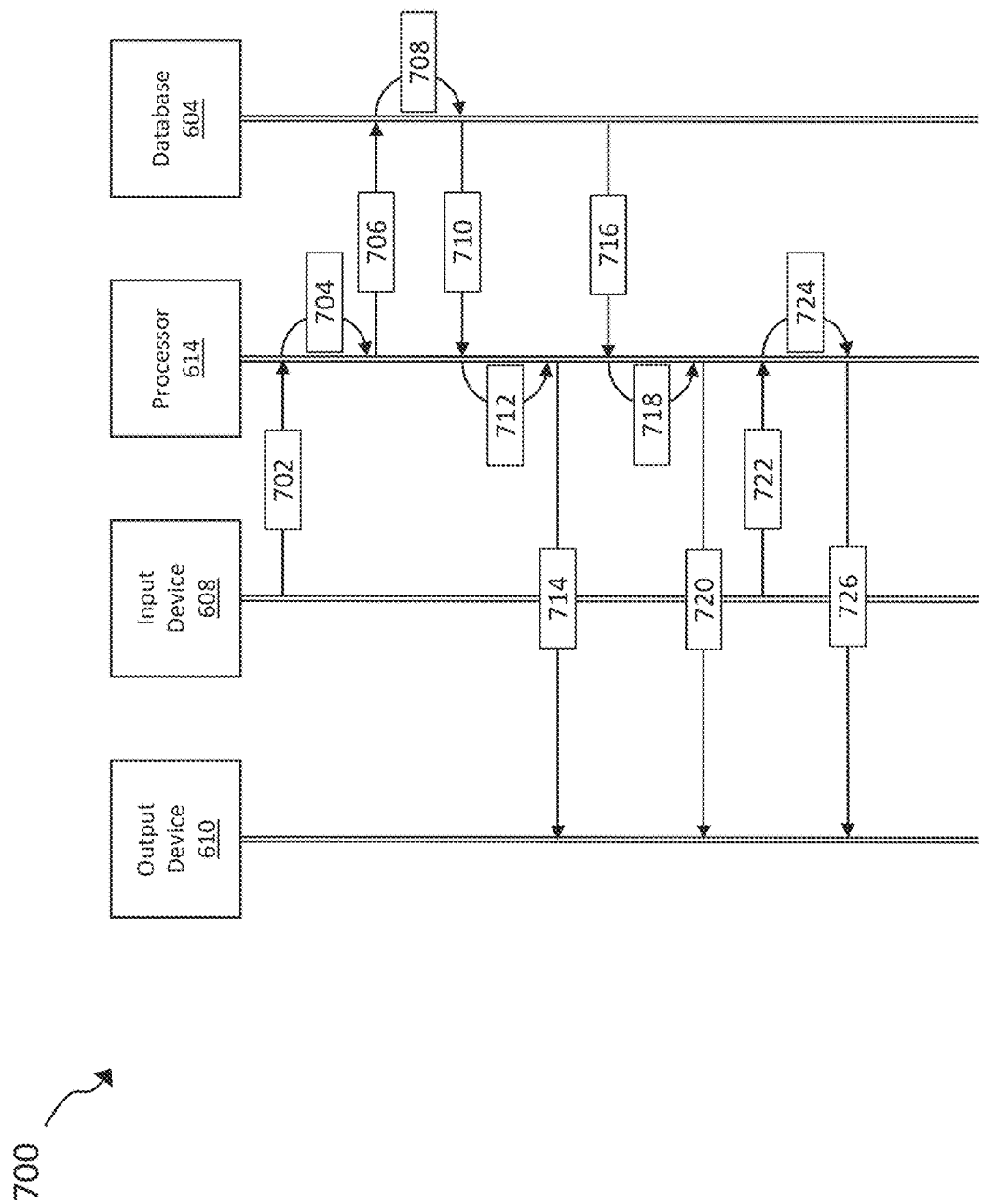
FIG. 9 is a flow chart illustrating an exemplary method of operation of the system shown in FIG. 8.

FIG. 9 shows a flow chart 700 illustrating an exemplary method of operation of the system 600. At step 702, a user can enter a data request via the input device 608, and the input device can provide the data request to the processor 614. The data request can include data characterizing a data set to request from the database 604.

At step 704, the processor 614 can process the data request. For example, the processor 614 can identify key information characterizing the requested data set, and format the data request for delivery to the database 604.

At step 706, the processor 614 can provide the data request to the database 604. For example, in some embodiments, the processor 614 can provide the data request to the database 604 via the network 606.

At step 708, the database 604 can process the request and identify the requested data set. For example, in some embodiments, the database can identify and/or determine criterion that can be used to identify the requested data set based on information provided in the request. In some embodiments, the criterion can be a unique identifier associated with a particular data set, a range of dates, and/or a particular type of industrial operation (e.g., LNG production operations). The database can then identify the requested data set based on the criterion.

At step 710, the database 604 can provide data to the processor 614. The data can include a header (e.g., header 400) and a portion of the requested data set. As described herein with regard to the header 400, the header can include a size field, properties field, sorting property field, number of groups field, sorting property values field, and/or groups size field.

At step 712, the processor 614 can process the data received from the database 604 and render a GUI (e.g., views 200, 300, 500 of the GUI). For example, the processor 614 can identify a size of the requested data set from the size field 402. The processor 614 can identify properties of the data set from the properties field 404 of the header. The processor 614 can identify the sorting property and the number of groups of subsets that have different values assigned to the sorting property from the sorting property field 406 and the number of groups field 408, respectively. Based on information within the sorting property values field 410, the processor 614 can identify values assigned to the sorting property of each subset of the various groups. The processor 614 can group subsets of data based on values assigned to the sorting property. The processor 614 can also determine a size of each group from the group size field 412.

Based on the number of groups of subsets, the processor 614 can determine a number of sections of a navigation bar (e.g., navigation bar 204). For example, the navigation bar can have one section for each group of subsets. Accordingly, each section of the navigation bar can be assigned to a different group. A length of the navigation bar can be determined based on predetermine instructions. In some embodiments, the processor 614 can assign a different color to each section of the navigation bar. In some embodiments, the colors can be determined based on predetermined instructions. As another example, in some embodiments, color gradients can be assigned to each section of the navigation bar.

The processor 614 can also determine a length of each section of the navigation bar based on the size of the corresponding group. For example, for each graphical element, a ratio of the length of the graphical element to a total length of the navigation bar can be equal to a ratio of the size of the corresponding group to the size of the data set.

The processor 614 can generate a table using data within the header and/or the portion of the data set received from the database 604. The table can be populated with data from the header and/or the portion of the data set. For example, a heading (e.g., heading 206) of the table can be populated with the properties received in the header. Values of various properties of subsets (e.g., subsets 208) can be populated with data from the portion of the data set received from the database 604. Accordingly, a portion of the table corresponding to the portion of the data set received from the database 604 can have populated values. Another portion of the table can have subsets in which values remain unassigned until the data is received from the database 604. In some embodiments, all values assigned to the sorting property can be populated using data from the sorting property values field 410.

The processor 614 can render the table and the navigation bar, with the navigation bar being positioned adjacent to the table. The navigation bar can extend along a first path between two points (e.g., points 204a, 204b) on the GUI.

In some embodiments, the GUI can include a loading bar (e.g., loading bar 214) and position identifier (e.g., position identifier 218). The loading bar 214 can extend along a second path between two points (e.g., points 214a, 214b) and can be positioned adjacent to and/or behind the navigation bar. In some embodiments, one point (e.g., point 214a) can be at a predetermined location on the GUI, while a position of the other point (e.g., point 214b) can correspond to a size of the received portion of the data set relative to the total size of the data set. As another example, the position of the second point can correspond to a percentage of the data set that has been received from the database 604. Accordingly, the processor can determine a percentage of the data set that has been received at the client 602, and determine a position of second point (e.g., point 214b) based on the percentage of the data set that has been received. As described herein with regard to FIGS. 3-4, a portion 216 of the loading bar 214 can extend between the point 214b and a point 214c where a vector extending from the point 204a, normal to the first path (e.g., the path along which the navigation bar 204 extends), intersects the second path (e.g., the path along which the loading bar 214 extends). The processor 614 can determine a position of the point 214b such that a ratio of a length of the portion 216 of the loading bar 214 to the total length of the navigation bar 204 can be equal to a ratio of the size of the portion of the data set received from the database 604 to the total size of the data set. Therefore, the position of the point 214b can be determined based on a percentage of the data set that has been received at the client 602.

The position identifier can be configured to travel along a third path that is parallel to the first path (e.g., the path along which the navigation bar 204 extends) and extend between a two points (e.g., points 218a, 218b). Referring to FIGS. 2-4, the position identifier 218 can encompass a portion of the navigation bar 204, thereby identifying which portion of the dataset is shown in the table 202. For example, in some embodiments, subsets of the dataset corresponding to the portion of the navigation bar 204 that is within an outer boundary of the position identifier 218 can be shown in the table 202. Accordingly, the data processor 614 can identify portions of the navigation bar 204 that are within the outer boundary of the position identifier and show corresponding subsets of the data set in the table 202. At step 712, the data processor 614 can also render the navigation bar and the loading bar.

At step 714, the processor 614 can provide data characterizing the rendered GUI to the output device 610. The output device 610 can display the GUI, including the table, navigation bar, position identifier, and loading bar.

At step 716, the database 604 can provide another portion of the data set to the processor 614. The processor 614 can update the table (e.g., table 202) to include the new portion of the data set. The processor 614 can also determine a percentage of the data set that has been received at the client 602, and determine an updated position of the second point (e.g., point 214b) of the loading bar based on the percentage of the data set that has been received. For example, referring to FIGS. 3, 4, and 9, the processor 614 can determine the updated position of the point 214b such that a ratio of the length of the portion 216 of the loading bar 214 to the total length of the navigation bar 204 can be equal to a ratio of the size of the portion of the data set received from the database 604 to the total size of the data set. The processor 614 can also render the GUI, including the updated table and loading bar.

At step 720, the processor 614 can provide data characterizing the rendered GUI to the output device 610. The output device 610 can display the GUI, including the table, navigation bar, position identifier, and loading bar.

At step 722, the user can select a point on the navigation bar via the input device 608, and the input device 608 can provide the user input to the processor 614. For example, the user can select a point that corresponds to a different section of the navigation bar.

At step 724, the processor 614 can process the user input and render several animations in response to the user input. For example, the processor 614 can render an animation of an indicator icon (e.g., indicator icon 220) at the location on the navigation bar selected by the user. The indicator icon can provide a user with visual feedback to confirm that the point on the navigation bar has been selected. The processor 614 can also render an animation showing the position identifier sliding along the navigation bar to be centered about the point selected by the user. Additionally, the processor 614 can identify subsets of the data set that correspond to the selected point on the navigation bar, and render the table to show subsets of the data set that correspond to the selected point on the navigation bar.

At step 726, the processor 614 can provide data characterizing the rendered GUI to the output device 610. The output device 610 can display the GUI, including the table, navigation bar, position identifier, and loading bar.

Some traditional GUIs visualize information related to industrial operations with various discrete graphical objects (e.g., charts, graphs, tables, and the like.) to provide summarized information to the user. Due to limited display space available on output devices (e.g., displays), such an approach can result in a cluttered and/or ineffective GUI. In some cases, due to limited display space, accessing desirable information related to a data set may require additional steps of navigation through the GUI. In other cases, the summarized information may be altogether unavailable. By embedding additional information about the data set within the navigation bar, the navigation bar can transform the data to provide an intuitive interface that conveys information about the data set. The navigation bar can allow a user to navigate through, scroll, and/or selectively visualize, certain data within the data set, while also providing visual representations desired information about the data set. The GUIs, including the table, navigation bar, loading bar, and/or position icon provide a specific improvement in the capabilities of computing device such as, e.g., laptops, desktops, tablets, mobile phones, headset displays, and the like.

In addition, by utilizing a header having predetermined data field that specify aspects of the data set, information (e.g., table length, properties of variables within the data set, distributions of values, and the like) can be incorporated into a graphical object to convey that information to a user. Such information can be conveyed intuitively and without requiring the client to receive (e.g., download) the entire dataset before such information can be determined by the client.

Although some example implementations are described above, other implementations are possible. For example, rather than rendering a table (e.g., table 202) within a GUI, a data processor can render a plot, image, chart, etc. As another example, a navigation bar (e.g., navigation bar 204), loading bar (e.g., loading bar 214), and/or position icon (e.g., position icon 218), can be curved, rather than straight, and can extend along curved paths.

Exemplary technical effects of the subject matter described herein include the ability provide a user with information related to a data set by embedding the information within a multipurpose navigation bar. By embedding additional information about the data set within the navigation bar, the navigation bar can allow a user to navigate through, scroll, and/or selectively visualize, certain data within the data set, while also providing visual representations desired information about the data set. Embedding additional information within the navigation bar can be particularly advantageous for smaller displays, or lower resolution displays, which may have limited display space available.

One skilled in the art will appreciate further features and advantages of the subject matter described herein based on the above-described embodiments. Accordingly, the present application is not to be limited specifically by what has been particularly shown and described. All publications and references cited herein are expressly incorporated herein by reference in their entirety.

Other embodiments are within the scope and spirit of the disclosed subject matter. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method, comprising:
   requesting, by a client from a database, a data set stored at the database, the data set including one or more subsets having values assigned to respective properties of an operation;
   receiving, at a client and from a database,
      a first portion of the requested data set; and
      metadata characterizing the requested data set, the metadata including a size of the requested data set, a number of groups within the requested data set, and a size of each group within the requested data set, wherein a group is a collection of subsets corresponding to a different value assigned to a predetermined property;
   rendering, to display by the client within a graphical user interface (GUI) display space, a table including at least a portion of the received first portion of the data set;
   determining, by the client and using the received metadata, properties of a first graphical object, wherein the first graphical object corresponds to a navigation bar comprising a plurality of sections within the navigation bar, wherein each point on the first graphical object is associated with a subset of the data set, and wherein the properties include,
      a number of sections, each section corresponding to a group of subsets within the data set, and
      a length of each of the sections within the first graphical object, wherein the length of each section corresponds to a first ratio of the size of the corresponding group to the size of the data set;
   rendering, to display by the client within the GUI display space, the first graphical object including the determined number of sections with the corresponding determined lengths, the first graphical object extending along a first path between a first point and a second point on the GUI display space;
   receiving a user selection of a point on the first graphical object within the GUI display space; and
   in response to the user selection of the point, updating, by the client, the rendered table to display a subset corresponding to the selected point.

2. The method of claim 1, wherein a first total length of the first graphical object is defined by a distance along the first path between the first point and the second point.

3. The method of claim 2, further comprising,
   rendering, within the GUI display space, a second graphical object adjacent to or behind the first graphical object, the second graphical object extending between a third point and a fourth point along a second path that is parallel to the first path, wherein a position of the fourth point with respect to the first and second points of the first graphical object corresponds to a size of the received first portion of the data set relative to the total size of the requested data set.

4. The method of claim 1, further comprising:
   assigning a different color to each section of the first graphical object; and
   rendering, within the GUI display space, each section with its assigned color.

5. The method of claim 3, wherein:
   a first length of a portion of the second graphical object extends between the fourth point and a fifth point, the fifth point defined by intersection of a vector extending from the first point, normal to the first path, with the second path; and
   second ratio of the first length of the portion of the second graphical object to the first total length is equal to a third ratio of the size of the received first portion of the data set to the total size of the requested data set.

6. The method of claim 3, further comprising:
   receiving, at the client, a second portion of the data set; and
   adjusting the position of the fourth point based on a size of the received second portion of the data set.

7. The method of claim 1, further comprising rendering, within the GUI display space, a third graphical object, the third graphical object illustrating the selected point on the first graphical object.

8. A system comprising:
   at least one data processor; and
   a memory coupled to the at least one data processor, wherein the at least one data processor is configured to:
      request, from a database, a data set stored at the database, the data set including one or more subsets having values assigned to respective properties of an operation;
      receive, from the database,
         a first portion of the requested data set; and
         metadata characterizing the requested data set, the metadata including a size of the requested data set, a number of groups within the requested data set, and a size of each group within the requested data set, wherein a group is a collection of subsets corresponding to a different value assigned to a predetermined property;
      render, to display within a graphical user interface (GUI) display space, a table including at least a portion of the received first portion of the data set;
      determine, using the received metadata, properties of a first graphical object, wherein the first graphical object corresponds to a navigation bar comprising a plurality of sections within the navigation bar, and wherein the properties of the first graphical object include, a number of sections, each section corresponding to a group of subsets within the data set, and a length of each of the sections within the first graphical object, wherein the length of each section corresponds to a first ratio of the size of the corresponding group to the size of the data set;

render, to display within the GUI display space, the first graphical object including the determined number of sections with the corresponding determined lengths, wherein the first graphical object extends along a first path between a first point and a second point on the GUI display space and wherein each point on the first graphical object is associated with a subset of the data set;

receive a user selection of a point on the first graphical object within the GUI display space; and in response to the user selection of the point, update the rendered table to display a subset corresponding to the selected point.

9. The system of claim 8, wherein a first total length of the first graphical object is defined by a distance along the first path between the first point and the second point.

10. The system of claim 9, wherein at least one data processor is further configured to render, within the GUI display space, a second graphical object adjacent to or behind the first graphical object, the second graphical object extending between a third point and a fourth point along a second path that is parallel to the first path, wherein a position of the fourth point with respect to the first and second points of the first graphical object corresponds to a size of the received first portion of the data set relative to the total size of the requested data set.

11. The system of claim 8, wherein at least one data processor is further configured to:
assign a different color to each section of the first graphical object; and
render, within the GUI display space, each section with its assigned color.

12. The system of claim 10, wherein,
a first length of a portion of the second graphical object extends between the fourth point and a fifth point, the fifth point defined by intersection of a vector extending from the first point, normal to the first path, with the second path; and
second ratio of the first length of the portion of the second graphical object to the first total length is equal to a third ratio of the size of the received first portion of the data set to the total size of the requested data set.

13. The system of claim 10, wherein the at least one data processor is further configured to:
receive a second portion of the data set; and
adjust the position of the fourth point based on a size of the received second portion of the data set.

14. The system of claim 8, wherein at least one data processor is further configured to render, within the GUI display space, a third graphical object illustrating the selected point on the first graphical object.

15. A non-transitory computer-readable medium storing instructions, which, when executed by at least one data processor forming part of at least one computing system, cause the at least one data processor to implement operations comprising:
requesting, from a database, a data set stored at the database, the data set including one or more subsets having values assigned to respective properties of an operation;

receiving, from the database,
a first portion of the requested data set; and
metadata characterizing the requested data set, the metadata including a size of the requested data set, a number of groups within the requested data set, and a size of each group within the requested data set, wherein a group is a collection of subsets corresponding to a different value assigned to a predetermined property;

rendering, to display within a graphical user interface (GUI) display space, a table including at least a portion of the received first portion of the data set determining, using the received metadata, properties of a first graphical object, wherein the first graphical object corresponds to a navigation bar comprising a plurality of sections within the navigation bar, and wherein the properties of the first graphical object include,
a number of sections, each section corresponding to a group of subsets within the data set, and
a length of each of the section within the first graphical object, wherein the length of each section corresponds to a first ratio of the size of the corresponding group to the size of the data set;

rendering, to display within the GUI display space, the first graphical object, the first graphical object including the determined number of sections with the corresponding determined lengths, the first graphical object extending along a first path between a first point and a second point on the GUI display space, wherein each point on the first graphical object is associated with a subset of the data set, and receiving a user selection of a point on the first graphical object within the GUI display space; and in response to the user selection of the point, updating the rendered table to display a subset corresponding to the selected point.

16. The non-transitory computer-readable medium of claim 15, wherein a first total length of the first graphical object is defined by a distance along the first path between the first point and the second point.

17. The non-transitory computer-readable medium of claim 16, further storing instructions, which, when executed by the at least one data processor, cause the at least one data processor to implement operations comprising:
rendering, within the GUI display space, a second graphical object adjacent to or behind the first graphical object, the second graphical object extending between a third point and a fourth point along a second path that is parallel to the first path, wherein a position of the fourth point with respect to the first and second points of the first graphical object corresponds to a size of the received first portion of the data set relative to the total size of the requested data set.

18. The non-transitory computer-readable medium of claim 15, further storing instructions, which, when executed by the at least one data processor, cause the at least one data processor to implement operations comprising:
assigning a different color to each section of the first graphical object; and
rendering, within the GUI display space, each section with its assigned color.

* * * * *